Oct. 13, 1970   R. ADELL   3,533,526
PLASTIC BOTTLE-ATTACHMENT MEANS
Filed Oct. 14, 1968   2 Sheets-Sheet 1
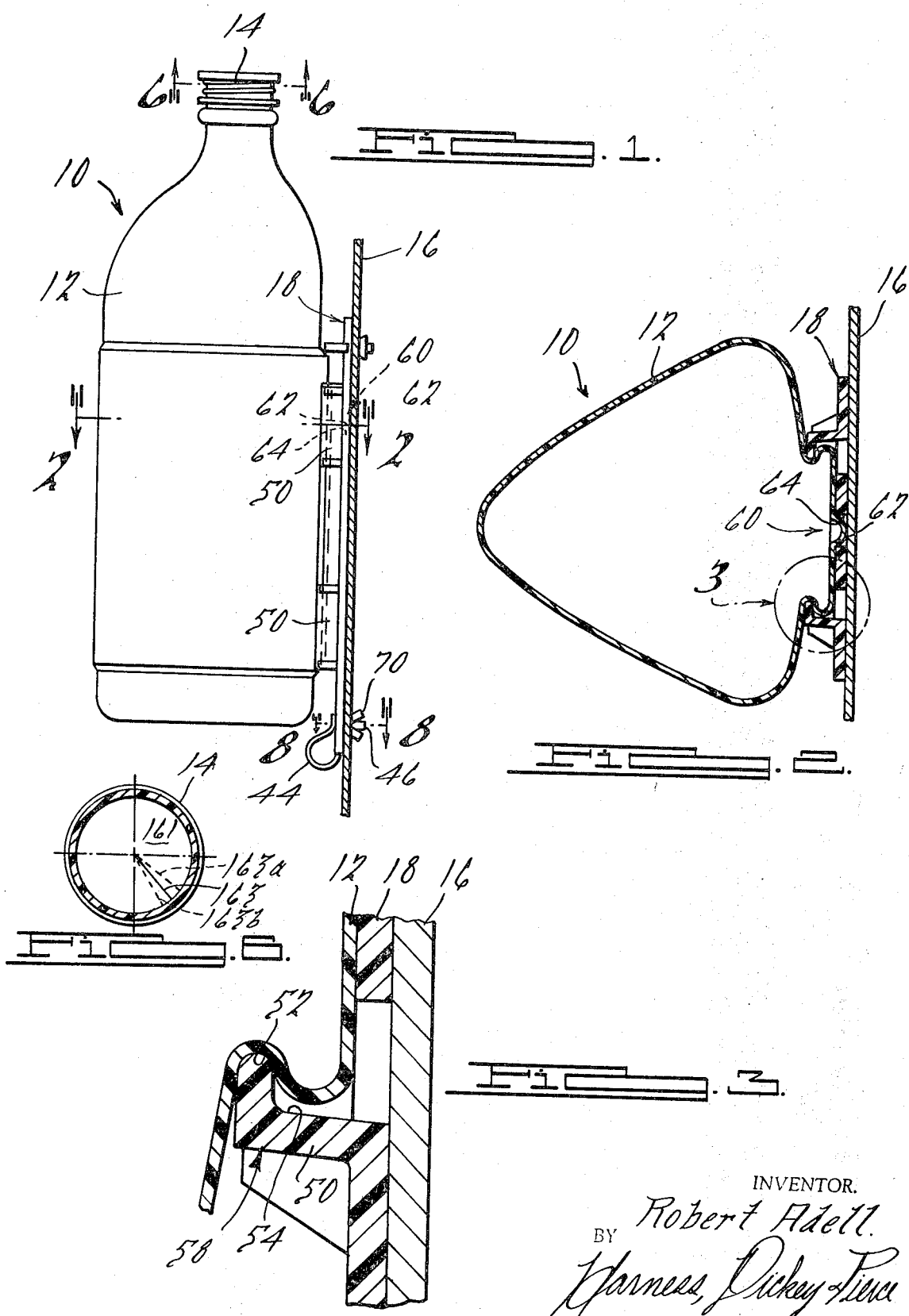
INVENTOR.
Robert Adell
BY Harness, Dickey & Pierce
ATTORNEYS

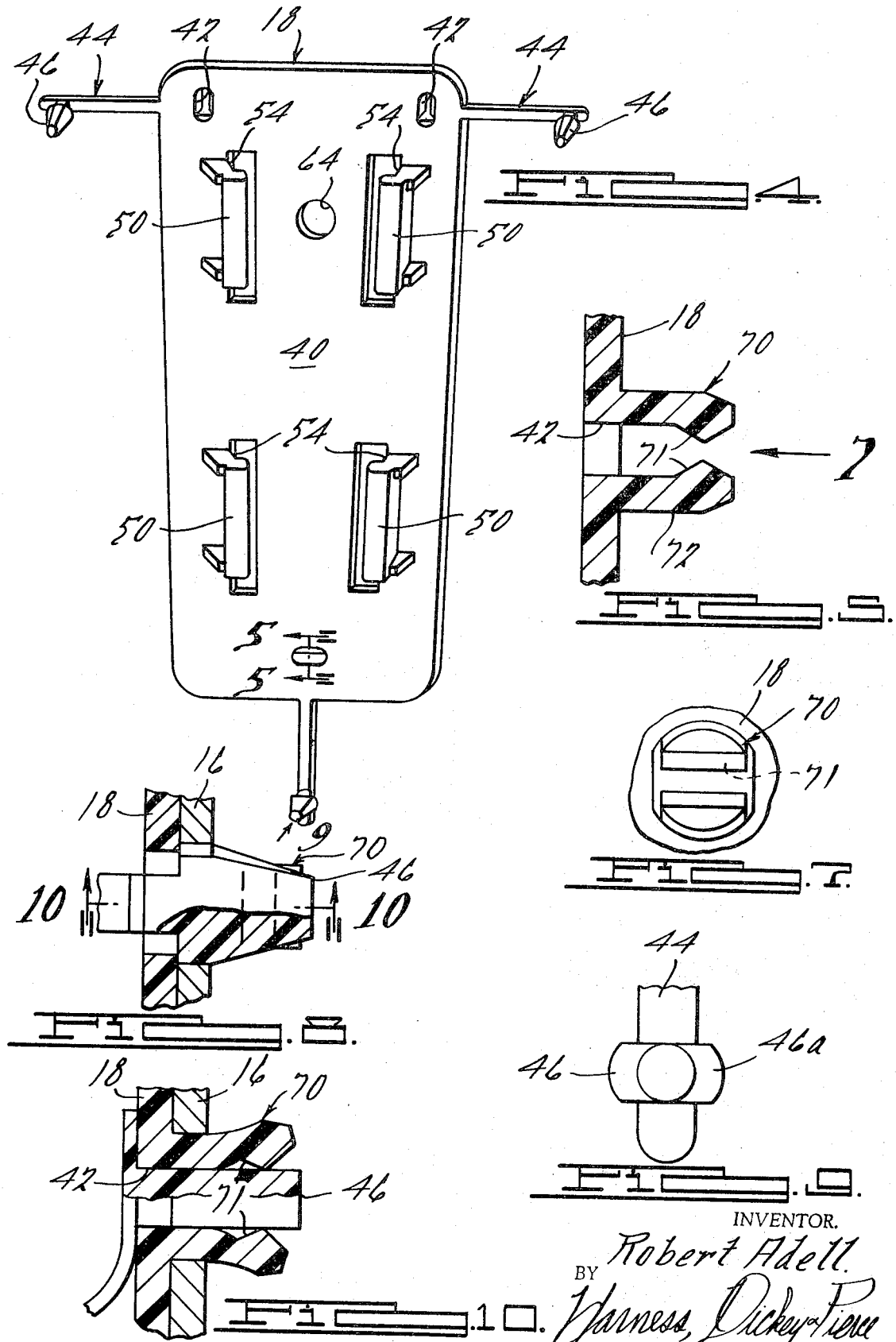

United States Patent Office 3,533,526
Patented Oct. 13, 1970

3,533,526
PLASTIC BOTTLE-ATTACHMENT MEANS
Robert Adell, Birmingham, Mich., assignor to Adell International, Inc., Detroit, Mich., a corporation of Michigan
Filed Oct. 14, 1968, Ser. No. 767,391
Int. Cl. B65d 51/16
U.S. Cl. 215—56            1 Claim

ABSTRACT OF THE DISCLOSURE

A plastic bottle-attachment assembly for use as a refill bottle generally adjacent a windshield washer sovent reservoir in automobies, trucks and the like vehicles. Said assembly specifically comprising a particular bracket attachment member which can be fixedly positioned and later easily removed from connection with an interior surface structure (such as the inside fender wall) underneath the hood of the vehicle, said particular bracket attachment member when in position being used for holding the plastic refill bottle.

CROSS REFERENCE TO RELATED APPLICATION

Reference is here made to applicant's copending U.S. patent application Ser. No. 767,388 entitled "Dispenser and Mounting Therefor" filed concurrently herewith on Oct. 14, 1968, in the name of the applicant herein, Robert Adell.

BACKGROUND OF THE INVENTION

This invention broadly relates to a plastic bottle-attachment assembly or means. More specifically, this invention relates to an assembly generally comprised of a plastic bottle which is used for refill purposes in connection with a windshield washer solvent system, wherein the plastic bottle is attached to an interior surface underneath the hood of an automobile, etc., by a unique bracket attachment means.

The present invention deals with an improved form of attaching these plastic refill bottles to the interior surface structure underneath the hood of the vehicle, with the surface being used for mounting the plastic refill bottle generally being at a point usually as close as conveniently possible to the reservoir.

In the past, it has been conventional to use a reservoir of one form or another which contains windshield washer solvent, said reservoir being located under the hood of an automobile, etc. It has been found highly desirable for owners of automobiles or other vehicles which contained such windshiled washer systems and their accompanying reservoirs to have a refill bottle located either generally adjacent the solvent reservoir or at least in a position underneath the hood of the vehicle such that the refill bottle can be picked up by the owner of the vehicle and used for the purpose of refilling or supplementing the windshield washer solvent supply within the reservoir after the supply has become depleted.

In the past any attempts at making satisfactory refill bottle assemblies have been subjected to and the cause of many problems due to their construction, general makeup and the like. For example, such refill bottles in the past have been made of glass and any such glass bottle is readily been subjected to breakage when stones fly up underneath the hood of the automobile. Furthermore, refill bottles of this nature in the past have been subjected to droppage which also causes breakage. Still further, these bottles have in the past been unduly heavy if made of glass or other alternative materials and this weight factor led to problems in the proper mounting of the prior art bottles, etc.

Specifically, there has been a problem in attempted refill bottle assemblies of the prior art relating to a proper mounting assembly for these bottles which could be easily manufactured and easily mounted underneath the hood of an automobile or other vehicle, while at the same time providing that the mounting could be easily removed so that the refill bottle assembly could be used in another vehicle. The difficulty with attempted prior mounting assemblies of this type has been that while the assembly could be mounted in one form or another, once it was mounted it was sometimes quite difficult to later remove the assembly without going through a difficult procedure of disassembling the mounting. The present invention overcomes this problem by providing a mounting assembly or mounting bracket which can be easily put into position or mounted on a generally flat or slightly curved surface underneath the hood of the vehicle, and this mounting bracket or assembly, as disclosed hereinafter, can at any later time be removed from its mounted position by simply disengaging pivotable actuating members which, upon disengagement enable the mounting bracket to be removed and used again either in a different location or in another vehicle.

Still another problem associated with the prior art refill bottles has been that normally these bottles were made of glass and such glass bottles in almost all instances, could not withstand the severe temperature cycles to which the bottle was subjected underneath the hood of an automobile throughout the season-to-season operation thereof.

Accordingly, in view of the above, it is an object of this invention to provide an improved plastic bottle-attachment assembly or means.

Another object of the present invention is to provide an improved plastic bottle attachment means which specifically allows for easy removal of the entire plastic bottle assembly from its mounted position so that the plastic bottle can be remounted at either a different location or in another vehicle.

Another object of the present invention is to provide a method of preparation of the plastic bottle-attachment assembly disclosed herein.

Other objects, features and advantages of the present invention will be apparent from the subsequent description and the appended claims, taken in conjunction with the accompanying drawings.

BRIEF DESCRIPTION OF THE DRAWINGS

FIG. 1 illustrates an upright side view of a plastic bottle attachment assembly in accordance with the invention herein;

FIG. 2 illustrates a view along the line 2—2 of FIG. 1;

FIG. 3 illustrates an enlarged sectional view of the area designated 3 in FIG. 2.

FIG. 4 illustrates an enlarged view of the bracket attachment means used for mounting the plastic bottle herein;

FIG. 5 illustrates a sectional view along the line 5—5 of FIG. 4;

FIG. 6 illustrates a sectional view along the line 6—6 of FIG. 1 for the purpose of illustrating the interior of the cap which is used for closure of the plastic bottle, which cap contains a paper member positioned or laminated within the cap on the flat surface at the inside top of the cap;

FIG. 7 illustrates a view in the direction of arrow 7 in FIG. 5;

FIG. 8 illustrates a sectional view along the line 8—8 of FIG. 1;

FIG. 9 illustrates a view in the direction of arrow 9 in FIG. 4; and

FIG. 10 illustrates a sectional view along the line 10—10 of FIG. 8.

SUMMARY OF THE INVENTION

Briefly stated, the present invention comprises a bottle like container said container being made of a plastic-like material capable of withstanding severe hot and cold temperature cycles, closure means for the container, attachment means for mounting the container on a supporting structure, said attachment means including, at least one mounting bracket, first connector means on one side of the bracket for mating connection with the container, second connector means protruding from the second side of the bracket for mating connection with the supporting structure, actuating means also attached to said bracket and operative to be moved into engaged position with said second connector means for locking same in position.

From a method aspect, briefly stated, the present invention comprises the method of preparing a plastic bottle-attachment assembly as above, comprising the steps of: (a) blow molding said container from a plastic material, and (b) injection molding from a plastic material said means for mounting the container.

DESCRIPTION OF PREFERRED EMBODIMENTS

FIG. 1 and FIG. 2 illustrate the plastic bottle-attachment assembly in accordance with the invention generally designated 10. The assembly is comprised of plastic bottle 12, a closure means or cap 14 for the bottle, and a bracket 18 which serves as an attachment means for mounting the container or plastic bottle on a supporting structure 16.

The supporting structure 16 may be any attachable surface underneath the hood of a vehicle which suitably carries the plastic bottle and attachment assembly, generally mounted as close as is conveniently possible to the windshield washer solvent reservoir, not shown.

The bracket 18 is more clearly illustrated in FIG. 4, and the bracket is comprised of a generally flat plate-like section 40, apertures 42 as seen from the front side of the bracket 18 in FIG. 4, and pivotable strap like members 44 which contain tapered actuating members or push connectors 46 at the ends thereof. The operation of these pivotable members 44 and the actuating portions 46 thereon will be discussed hereinafter.

The bracket 18 also contains frontwardly extending members 50 as viewed in FIG. 4, which members 50 are more clearly illustrated in the enlarged sectional view of FIG. 3.

With reference now to FIG. 3 it is seen that the plastic bottle 12 is mounted and positioned to be held within the members 50 which cooperate with a pair of elongated track grooves 52 formed in the back of the plastic bottle 12, which is blow molded, such that the track portions 52 on the back of the bottle can be engaged with the receiving channel area 54 formed between the extending members 50 to hold the plastic bottle in position.

Upward and downward movement of the bottle 12 within the receiving track arrangement formed by the members 50 is limited by the snap lock generally designated 60 in FIGS. 1 and 2.

The snap lock 60 operates as follows. When the plastic bottle is slidably positioned within the receivable track arrangement 52–54 the sliding movement proceeds freely until the bottle is substantially fully positioned within the track and then at this point the protruding hump 62 registers with and snaps into position within the opening or hole 64 formed within the plate section 40 of the bracket 18. Once registry occurs between the hump or protrusion 62 and the hole 64 then the bottle is what may be considered snap locked into position, but easily capable of release therefrom by a sharp upward lift on the bottle.

FIG. 5 more clearly illustrates a sectional view along the line 5—5 of FIG. 4 showing the makeup of the aperture 42 mentioned above. Aperture 42 as seen from the front side of the bracket 18 is a straight-through aperture in the bracket 18. As further shown in FIG. 5 on the back side of the bracket 18 there is an extending column shaped member or hollowed out receiving portion designated 70. This hollowed out receiving portion 70 on the back side of the bracket 18 is adapted to receive for engagement therewithin the tapered actuating member 46, which in engaged position is illustrated in FIG. 1, 8 and 10.

Operation of the tapered actuating member 46 within the hollowed out receiving portion 70 is as follows. Mounting of the bracket 18 to an interior surface structure 16 underneath the hood of a vehicle such as an automobile is carried out by first having drilled within the surface suitable apertures which will closely fit in mating relationship with the exterior peripheral surface 72 of the hollowed out receiving portion 70. Once the bracket is placed into position by inserting the portions 70 into the three holes drilled in the surface 16, then the tapered actuating members are pivoted by moving the strap like member 44 such that the tapered members 46 are engaged with the aperture 42 hollowed out receiving portion 70 again as shown in FIGS. 1, 8 and 10. As is most clearly shown in FIG. 10 when the tapered member 46 is pushed through the hollowed out receiving portion 70 contact is made with the camming surface area 71 on the inside of the hollowed out receiving portion 70 such that the member 70 is spread out and thereby put in locking engagement within the holes formed in the surface structure 16.

FIG. 6 illustrates a sectional view taken along the line 6—6 of FIG. 1, and FIG. 6 illustrates how the closure means or cap 114 used in the invention is vented to relieve the pressure buildup when the solvent or alcohol within the windshield washer liquid of bottle 112 becomes overly pressurized due to high temperatures underneath the hood of the vehicle, etc. Operation of the vented cap is as follows. First, a paper sealing member is laminated within the cap to act as a seal when the cap is threaded on to the bottle 112. The paper sealing member 161 has a slit portion generally cut therewithin as designated at 163. Normally, this slit portion 163 is in closed position when the cap is in normal operating use screwed down tightly on the bottle 112. However, when pressure builds up within the bottle, the slit portion 163 expands such that the slit is opened to a position designated by the dotted lines showing open sides of the slit 163a and 163b. When the slit is forced open by pressure within the bottle to the position 163a–163b, then there is an opening which permits the vaporized solvent or alcohol, etc., to escape through the venting action provided by the paper sealing member 161 within the cap 114.

FIG. 7 illustrates an end view taken along the arrow direction designated 7 of FIG. 5 to show an end view of the hollowed out receiving portion 70 which extends from the back side of the bracket 18.

FIG. 9 illustrates an end view taken along the direction of arrow 9 in FIG. 4, and shows a close-up end view of the tapered actuating member 46 which is engaged with the hollowed out receiving portion 70 to lock the portion 70 in position after the bracket has been mounted on a surface such as 16 discussed hereinabove. As shown in FIG. 9 the tapered actuating member 46 contains a tapered camming surface 46a thereon which (when contacted with the interior oppositely opposed camming surface 71 on the inside of the hollowed out receiving portion 70) spreads the column shaped receiving portion 70 into a locking engagement with the surface structure 16 as shown in FIG. 10 such that the bracket is lockably positioned or mounted on the surface structure 16.

The plastic material used for the plastic bottle described herein may suitably be any plastic material capable of withstanding high and low temperature cycles as are sustained by operating components underneath the hood of a normal internal combustion engine vehicle. For example, such temperature cycles to which the bottle and other plastic portions of the assembly herein are subjected would be a temperature cycle within the range of approximately −40° F. up to as high as about 250° F. It has been discovered that a highly suitable plastic material for use as the material from which the plastic bottle herein is made is a high density polyethylene. As a particular example of such a high density polyethylene suitable for use as a material for the bottle, reference is here made to the polyethylene material available from the Celanese Corporation, designated product EA–60–42. The method of making the bottle or container is to blow mold the bottle from a suitable plastic material such as the high density polyethylene material just mentioned hereinabove. It has been discovered that a blow molded bottle of this type gives the most satisfactory results and it also has been found that the blow molded bottle gives excellent properties relative to overcoming the problems set forth hereinabove.

The plastic material from which the mounting means or bracket is made, should also be a plastic material generally meeting the temperature cycling elements outlined above. The mounting bracket is most suitably formed by injection molding and for that reason an injection graded plastic material should generally be used in preparation of the bracket. Again, with respect to the bracket, it has been found that a most suitable material for use as the bracket, is an injection grade high density polyethylene plastic. Specifically, such a plastic material which has been found to be acceptable is Celanese product A–60–500M.

While it will be apparent that the preferred embodiments of the invention disclosed are well calculated to fulfill the objects above stated, it will be appreciated that the invention is susceptible to modification, variation and change without departing from the proper scope or fair meaning of the subjoined claim.

What is claimed is:

1. A plastic bottle-attachment assembly comprising:
   a bottle like container, said container being made of a plastic-like material capable of withstanding severe hot and cold temperature cycles,
   closure means for the container,
   attachment means for mounting the container on a supporting structure,
   said attachment means including:
   at least one mounting bracket,
   first connector means on one side of the bracket for mating connection with the container,
   second connector means protruding from the second side of the bracket for mating connection with the supporting structure,
   actuating means also attached to said bracket and operative to be moved into engaged position, with said second connector means for locking same in position, said actuating means including at least one pivotable member containing a tapered actuating member generally at the end thereof,
   said tapered actuating member fitting into a hollowed out receiving portion within said second connector means to expand same into a locked position,
   said temperature cycle being within the range of about −40° and about 250° F.,
   said container being a polyethylene bottle, and
   said assembly being further characterized as including:
   a vented cap as the closure means for said container,
   said vented cap having mounted therewith a paper sealing member which is brought into sealing operativeness when the cap is tightened onto the container, said paper member having a slitted portion therein which is normally in a closed position but which opens upon a pressure build-up within said container to relieve said pressure.

References Cited
UNITED STATES PATENTS

| | | | |
|---|---|---|---|
| 2,235,101 | 3/1941 | Enkur | 215—56 |
| 3,144,695 | 8/1964 | Budwig | 24—73.74 X |
| 3,225,951 | 10/1965 | Poston | 215—1 X |

FOREIGN PATENTS 1,455,461  9/1966  France.

GEORGE E. LOWRANCE, Primary Examiner

U.S. Cl. X.R.

215—1, 100; 248—313